UNITED STATES PATENT OFFICE.

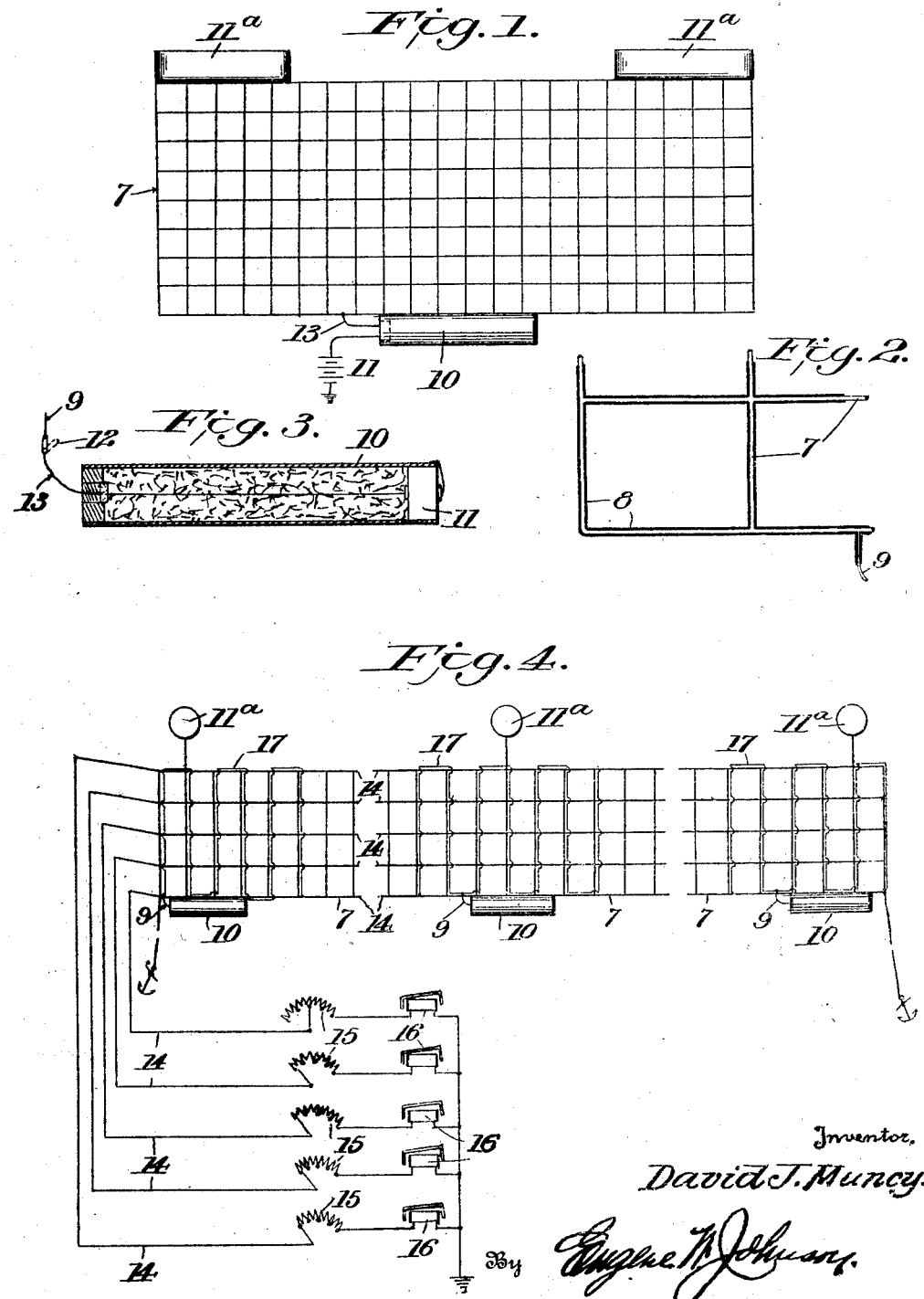

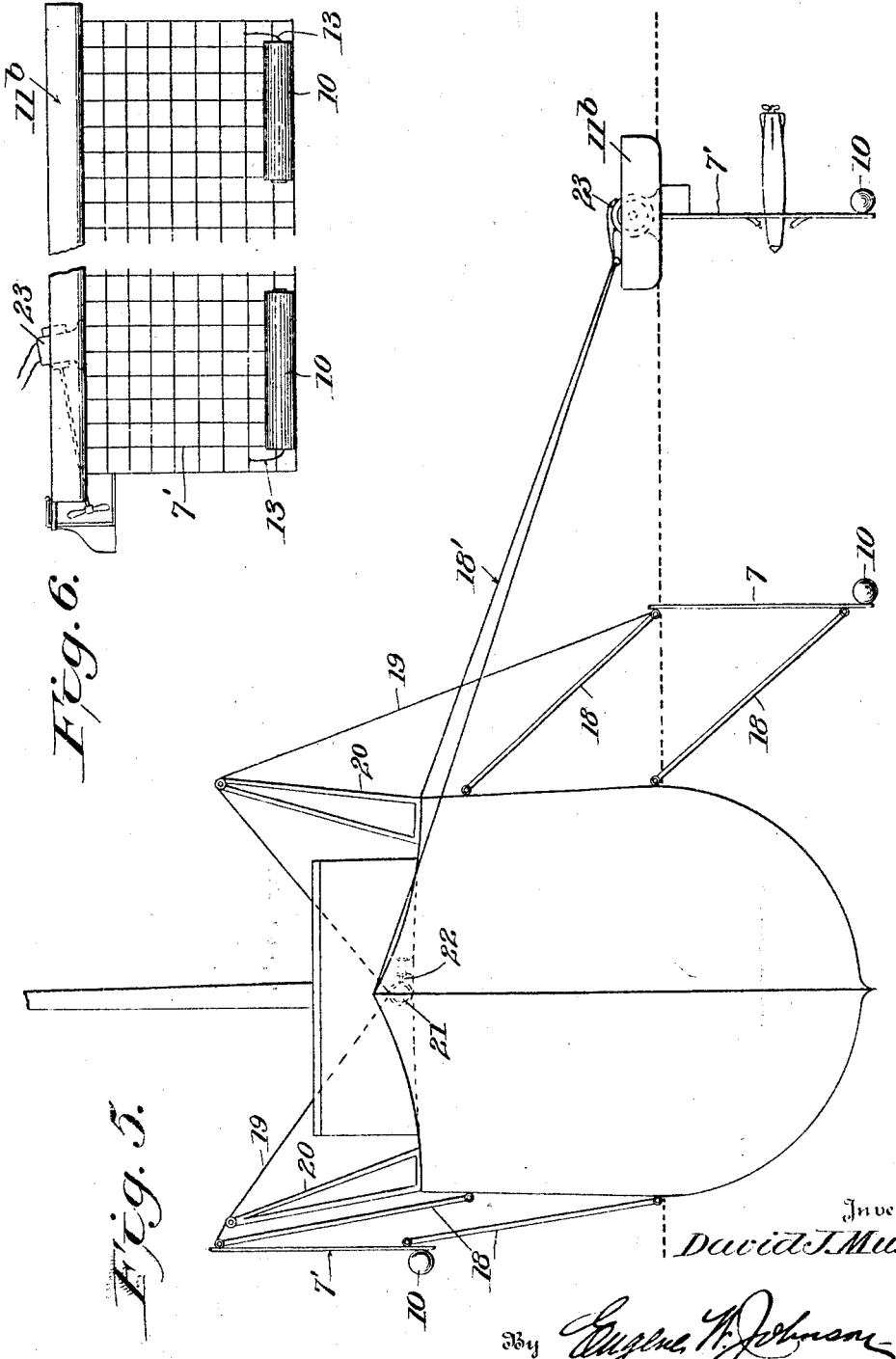

DAVID J. MUNCY, OF AMARILLO, TEXAS.

GUARD.

1,353,811. Specification of Letters Patent. Patented Sept. 21, 1920.

Application filed May 29, 1917. Serial No. 171,713.

*To all whom it may concern:*

Be it known that I, DAVID J. MUNCY, a citizen of the United States, residing at Amarillo, county of Potter, State of Texas, have invented certain new and useful Improvements in Guards, of which the following is a specification.

This invention relates to certain new and useful improvements in guards for marine use which may be used as a protection of vessels against attacks by torpedoes or as a barrier against submarine vessels in channels or other water-ways, and my invention provides a submerged guard or protecting device that comprises a net or barrier that has an insulated conductor associated therewith that is electrically connected to provide a normally open circuit which includes therein a mine or receptacle as a shell which will be exploded by fracture or rupture of the conductor, as exposure thereof to water will close the circuit.

The basic mode of operation of the device admits of numerous modifications as to the application and uses thereof without departure from the dominating feature of providing a submerged guard with an open circuit that is closed by exposure to water, as will be hereinafter set forth.

The accompanying drawings illustrate a preferred embodiment of my invention, in which:

Figure 1 is a front elevation of one section of a guard or barrier made to accord with my invention.

Fig. 2, is a detail view of a portion of the guard or barrier.

Fig. 3, is a longitudinal section of a shell, or receptacle for an explosive which is also constructed to contain a battery.

Fig. 4, is a diagrammatical view showing a plurality of guards or barriers arranged as protecting means for channels, water-ways and harbors.

Fig. 5, is a view showing the guard applied to a ship or vessel, in which instance one of the guards is adapted to be raised and lowered and an outer guard is connected to the ship beyond the first mentioned guard.

Fig. 6, is a side elevation showing the guard attached to a float having means for propelling the same.

Referring more particularly to Figs. 1, 2 and 3 of the drawings, it will be noted that the net or barrier 7 comprises a structure that is made of metal which is covered with insulation 8 of a waterproof nature said net having a lead wire 9, electrically connected therewith, that leads to a mine, shell or receptacle 10, that contains an explosive and a battery 11, which is electrically connected to the shell. The net or barrier is associated with supporting means of any suitable character as floats 11. The lead wire 9 will have a switch 12 for breaking the connection 13 when desired.

When the structure shown by Figs. 1, 2 and 3, is submerged there will be an open circuit, but when the insulation of the net is broken or fractured so that the water reaches the metal, the electric circuit will be closed, through the water to the metallic exterior of the shell and to the terminals in the shell to cause an explosion of the same, so as to destroy a torpedo or a submarine contacting with the guard.

Referring to Fig. 4, which illustrates diagrammatically, a series of guards, each having an insulated conductor 14, connected to an annunciator 16, to indicate at a distance the firing of a mine or shell, by the rupture of the insulation on the submerged portion of the guard, to close the circuit through the water and fire the mine or shell and setting in operation the indicating means, each guard having a separate wire to the annunciator.

In the arrangement shown by Fig. 4, the shells or receptacles 10 and the nets are each provided with an insulated conductor 17 and it is the rupture of this conductor and the exposure of the same to the sea water that closes the circuit to effect an explosion. Floats may be attached to the barriers and they in use are anchored across a channel or in a water way and as many barriers may be used as may appear necessary as the destruction of one will not render the others noneffective.

From the foregoing it will be seen that the construction of the net may be varied and that the explosion of the shell when the insulated conductor is broken is not limited to a receptacle which incloses a battery as the source of electricity may be otherwise obtained, and the battery may be carried by the floats. The floats may be submerged and the mines or shells co-act therewith to maintain the nets in substantially vertical position. The insulated conductors will be of sufficient strength to resist fracture by contact with debris, and when desired a single net with a plurality of floats and mines associated therewith may be used.

The invention is applicable as a torpedo guard for ships, and when applied to such the net or structure 7 is connected to a ship or vessel by spars, so that the guard may be raised and lowered, by a flexible connection that is suitably guided to an electrically released drum, the restraining means for the drum being actuated from a distant point.

Referring to Fig. 5 of the drawings, (Sheet 2) a guard or barrier of the construction hereinbefore described and of sufficient length or made up of connected units is connected to a ship or vessel by spars 18 of suitable length the upper spar having attached thereto a flexible connection 19 that is guided by a sheave on an upright 20 to a drum 21 the rotation of which is restrained by an electrically actuated catch or detent 22. When the guard attached to the spars is in an elevated position it may be instantaneously released to be positioned alongside of the vessel, as shown.

To provide a second barrier or defense or one that may be used independent of the one that is attached to the vessel, as previously described, a guard 7' or a plurality thereof will be attached to a float 11^b that is provided with a motor 23, preferably electric for driving a propeller for the float, power to drive the motor being obtained from the vessel by means of a cable 18' that contains feed wires, the float 11^b will have a rudder that is set to direct the float away from the vessel and the cable and rudder will coöperate to maintain the guard 7' so that it will travel in line with the vessel. The guard 7' may be used independent of the one that is attached to the vessel, but when used as shown by Fig. 5 the cable 18' will have a wire or conductor that leads to the barrier and to the electrically operated detent to effect an immediate release of the drum and flexible connection so that the barrier attached to the spars will be lowered when the circuit to the release is closed by the fracture of the float sustained guard.

The float having self-contained propelling means as an electric motor may be used to mine channels or to place from shore a series of the guards.

In case of the device being used as illustrated by Fig. 5, and when a torpedo is not stopped by the barrier 7' it will be so checked that it will be destroyed or stopped by the guard carried by the spars.

In view of the foregoing it will be plain that the invention is not limited to the simultaneous use of all the parts and that as indicated by the claims a wide variation from the disclosure is permissible without departing from the essential features of my invention.

I claim.

1. A guard comprising a metallic reticulated fabric that is covered with insulating material, a mine attached to and electrically connected with the metallic element of the fabric, a battery, the parts being associated to complete an electric circuit through the medium in which the fabric is submerged when a part of the fabric is ruptured.

2. A guard for the purpose set forth comprising an insulated metallic fabric, means associated with the fabric for suspending the same in a fluid, a mine or receptacle containing an explosive and provided with means for electrically connecting the same with the metallic element of the fabric, a batery, the parts being organized so that upon rupture of the insulation of the fabric a circuit will be completed to effect an explosion of the mine or receptacle.

3. A guard that is adapted to be submerged comprising a fabric or barrier, an insulated conductor maintained by the fabric or barrier, a mine or receptacle which contains an explosive medium, that is electrically connected with the insulated conductor, a source of electricity connected with the insulated conductor, the parts being organized so that the circuit will be closed upon rupture of the insulation of the conductor through the medium in which the fabric or barrier and said conductor are submerged.

4. A plurality of guards, each guard having an insulated member adapted to be submerged, connected by an insulated conductor to a mine or shell containing an explosive, included in same circuit means to announce at a distance the destruction of said shell or mine, said announcing means to connect with a battery and to the ground, to form an open circuit, so that the rupture of the insulation on the submerged guard will close the circuit through the water to fire the mine, and announce which guard has been ruptured.

DAVID J. MUNCY.